J. C. ALEXANDER.
PROCESS OF CONDENSING MILK.
APPLICATION FILED DEC. 9, 1910.
994,555.
Patented June 6, 1911.
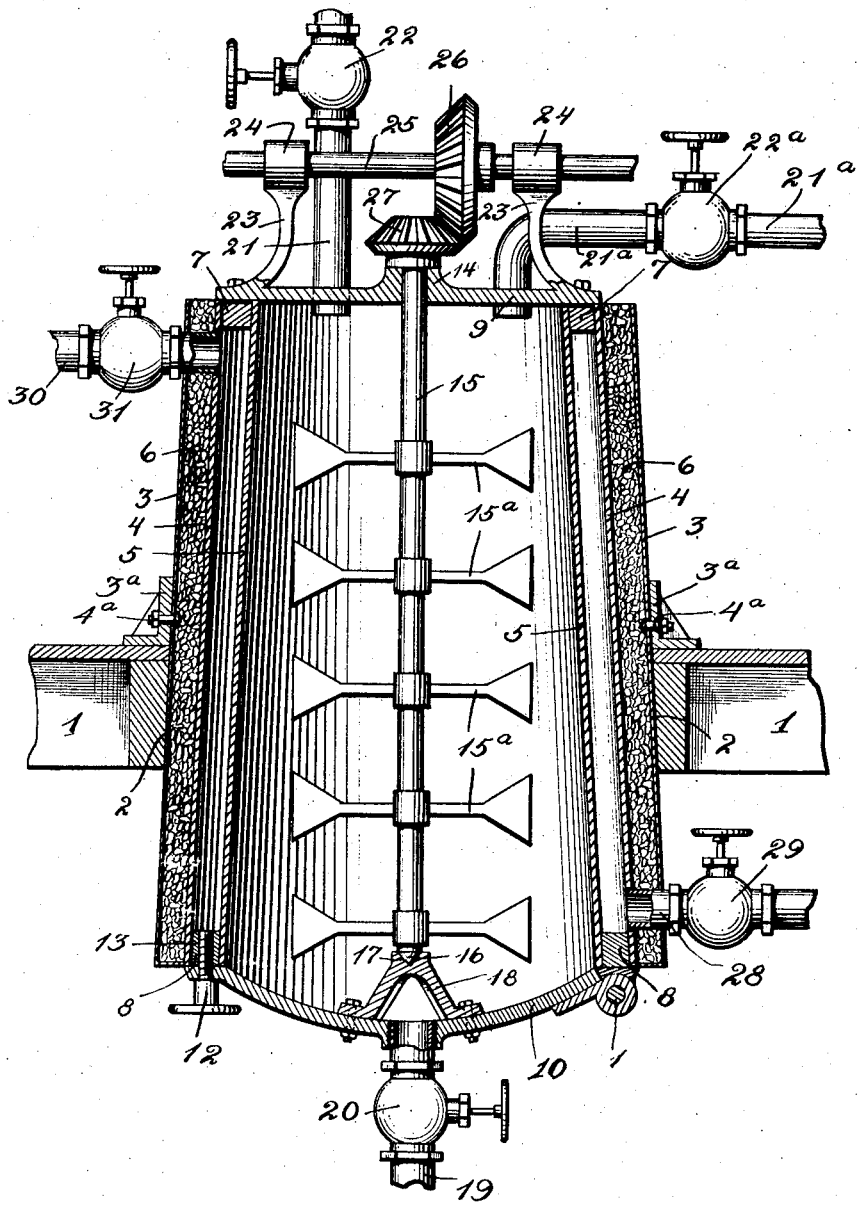
Witnesses
Inventor
James C. Alexander
By
C. L. Parker
Attorney

UNITED STATES PATENT OFFICE.

JAMES CHRISTIAN ALEXANDER, OF ROSEBURG, OREGON.

PROCESS OF CONDENSING MILK.

994,555.   Specification of Letters Patent.   Patented June 6, 1911.

Application filed December 9, 1910. Serial No. 596,454.

*To all whom it may concern:*

Be it known that I, JAMES C. ALEXANDER, a citizen of the United States, residing at Roseburg, in the county of Douglas and State of Oregon, have invented certain new and useful Improvements in Processes of Condensing Milk, of which the following is a specification.

My invention relates to a novel process by freezing for condensing milk.

The concentration of milk by heat in vacuum pans is well known, and possesses disadvantages, chief among which is the losing to a considerable extent, by the full milk, of a considerable amount of its aroma. This loss of aroma is due to the escape from the full milk of the volatile oils to be found in the butter fat.

My invention aims to overcome the above referred to disadvantage, by concentrating the milk by freezing in contra-distinction to heating it.

An important object of this invention is to provide a process of the above described character which will expedite and greatly cheapen the concentrating of milk.

Other objects and advantages of this invention will be apparent during the course of the following description.

In carrying out my process, full or skim milk is introduced into a suitable receptacle, and a vacuum created therein to remove air from the milk and prevent the same from bubbling or foaming. The milk is then set in rapid rotary motion. The receptacle containing the milk is next exposed to a freezing medium, whereby the water in the outermost portion of the milk begins to freeze upon the inner wall of the receptacle. The more solid constituents of the milk, casein, butter fat, sugar of milk, etc., do not freeze as readily as the water, and these collect in the central portion of the receptacle. The more solid constituents, or the condensed milk, may then be withdrawn from the receptacle.

In the accompanying drawing, forming a part of this specification, the figure is a central vertical sectional view through an apparatus, within which my process may be advantageously carried out.

Referring now to the drawing, within which a preferred embodiment of my apparatus is shown for carrying out my process, the numeral 1 designates a supporting structure, having a suitable opening 2 formed therethrough, for receiving and supporting the apparatus, comprising three substantially frusto-conical casings or shells 3, 4 and 5. These casings increase in diameter downwardly and are disposed one within the other. The outermost casing 3 is bolted to a ring $3^a$, as shown at $4^a$. The casings 3 and 4 form a space therebetween for the reception of cork, charcoal or other heat insulating material 6. Disposed between the casings 3 and 4 near their upper and lower ends respectively, are spacing rings 7 and 8, which are rigidly connected to said casings in any suitable manner. The upper end of the innermost casing 5 is closed by a stationary head 9, having rigid connection with the upper ring 7 in any suitable manner. The lower end of this innermost casing is normally closed by a swingingly mounted head 10, which may preferably be curved in cross-section, as shown. The lower head 10 has a hinged connection with the casing 5, as shown at 11. The lower head 10 is locked in its closed position by a hand-screw 12, operating within a screw-threaded opening 13 formed through the lower spacing ring 8.

The upper head 9 is provided preferably centrally thereof with an upstanding boss 14, through which is journaled a spindle 15, extending centrally and longitudinally of the innermost casing 5. The lower end of this spindle is pointed, as shown at 16, and is disposed within a suitable opening 17, formed on a spider-bearing 18. This spider-bearing is rigidly connected upon the central portion of the lower head 10, as shown. The spindle 15 carries a plurality of agitators or paddles $15^a$, which increase in width toward their ends, as shown. The head 10 is provided preferably adjacent the spider-bearing 18, with an opening for receiving one end of a draw-off pipe 19 which carries a valve 20, as shown. A second pipe 21 has connection preferably with the upper head 9, as shown, for supplying milk within the casing 5. This second pipe may have suitable connection with a milk holding tank (not shown) and is provided with a cut-off valve 22. The head 9 has suitable connection with a vacuum pipe 21ª, as shown, which is connected with a vacuum tank (not shown). The vacuum pipe 21ª carries a cut-off valve 22ª, as shown. Disposed upon the upper head 9 is a pair of upstanding arms 23, carrying heads 24, through which is suitably journaled a horizontal driving shaft 25. This driving shaft may receive its rotation from any suitable source. The driving shaft 25 carries a fast bevel-gear 26, which is in constant mesh with a second bevel-gear 27, having rigid connection with the spindle 15, as shown. Disposed near the lower end of the apparatus, is a pipe 28, which is adapted to supply a cooling medium such as liquefied ammonia, carbonic acid gas, brine solution or the like, to within the casing 4. The pipe 28 is provided with a cut-off valve 29, as shown. Disposed adjacent the upper end of the apparatus, is a pipe 30, which is adapted to withdraw the freezing medium previously introduced within the casing 4. The pipe 30 is provided with a cut-off valve 31.

In practicing my process in connection with the above described apparatus, the milk is first introduced within the casing 5 through the pipe 21. The valve 22ª is then opened, whereby the air is exhausted from the receptacle 5, and a suitable vacuum formed therein. The spindle 15 is subsequently set in rapid rotation, whereby the milk is made to rapidly rotate within the casing 5, by virtue of the agitators or paddles 15ª. While the milk is thus being rapidly rotated, either liquefied ammonia, carbonic acid gas, brine solution, or any suitable freezing medium is introduced through pipe 28 into casing 4. The outermost portion of the milk in engagement with the casing 5, becomes the coldest, whereby the water contained therein is lowered sufficiently in temperature to freeze and form a film of ice upon the inner surface of said casing. The more solid constituents of the milk, casein, butter fat, sugar of milk, etc., do not freeze as readily as the water, and are washed away from the film of ice, to be collected in the central portion of the casing 5, and subsequently withdrawn through pipe 19. The concentration depends on the fact that the water is frozen in the outer layer of the mass and the other elements of this part of the milk are mixed with the unfrozen milk. It is worthy of note that where the atmospheric temperature is sufficiently low, the apparatus may be simplified, by dispensing with the casings 3 and 4, in which event the process may be carried out in the casing 5, as above described. By exhausting the air from within the casing 5, the milk may be agitated under a vacuum, whereby the milk being deprived of air will not foam or bubble. After the withdrawal of the condensed milk, the freezing medium is withdrawn through the pipe 30, from within the casing 4. A heating medium, such as heated ammonia gas or the like, may now be introduced through the pipe 28 into casing 4, whereby the sheet of ice above referred to as being deposited or formed upon the interior of the casing 5, is loosened from the same, and upon winging the lower head 10 to its open position, such sheet of ice may be readily removed or will drop from within the casing 5. This ice can be collected and utilized, whereby the cost of carrying out the process is materially reduced.

Although I have shown and described my process in connection with the concentration of milk, yet other fluids such as sugar water, gelatin solution, and glue solution, may be advantageously concentrated by the said process. The invention is thought to be sufficiently broad in scope to cover the concentration of almost any fluid composed of two or more constituents that freeze at different temperatures.

I wish it understood that the form of my apparatus herewith shown and described, is to be taken as a preferred example of the same and that certain changes in the shape, size and arrangement of parts may be resorted to without departing from the spirit of my invention or the scope of the subjoined claims.

Having described my invention, I claim:—

1. The herein described process of concentrating milk, which comprises the placing of the milk in a closed receptacle, creating a vacuum within the receptacle to remove the air from the milk, agitating the milk after the vacuum is created and the air removed from said milk whereby such agitation will not cause the milk to foam, and applying a freezing medium to the exterior of the receptacle to cause the water in the outer portion of the mass of the milk to freeze, the other elements of the said outer portion of the milk becoming mixed with the unfrozen milk.

2. The herein described process of concentrating milk, which comprises the placing of the milk in a closed receptacle, exhausting the air from the receptacle to remove such air from the milk, rotating the milk after the air has been exhausted from the receptacle and removed from said milk whereby such rotation will not cause the milk to foam, and applying a freezing medium to the exterior of the receptacle to cause the water in the outer portion of the mass of the milk to freeze, the other elements of the said outer portion of the mass of the milk becoming mixed with the unfrozen milk.

In testimony whereof I affix my signature in presence of two witnesses.

JAMES CHRISTIAN ALEXANDER.

Witnesses:
   F. W. DILLARD,
   G. A. HARMON.